(12) United States Patent
Moczygemba

(10) Patent No.: US 6,845,404 B2
(45) Date of Patent: Jan. 18, 2005

(54) SYSTEM, METHOD AND COMPUTER PROGRAM PRODUCT FOR SELECTING A MODE OF OPERATION OF A DEVICE IN AN INFORMATION HANDLING SYSTEM

(75) Inventor: Nathan D. Moczygemba, Pflugerville, TX (US)

(73) Assignee: Dell Products, L.P., Round Rock, TX (US)

(*) Notice: Subject to any disclaimer, the term of this patent is extended or adjusted under 35 U.S.C. 154(b) by 238 days.

(21) Appl. No.: 10/080,188

(22) Filed: Feb. 21, 2002

(65) Prior Publication Data

US 2003/0158976 A1 Aug. 21, 2003

(51) Int. Cl.$^7$ .............................................. G06F 13/00
(52) U.S. Cl. .............................. 710/6; 710/15; 710/62; 710/72; 711/100
(58) Field of Search ............................. 710/5–7, 15–19, 710/32–35, 62–64, 72–74, 57, 261; 711/4, 12, 100, 163, 167, 112; 358/118; 369/44.34; 714/5

(56) References Cited

U.S. PATENT DOCUMENTS 5,659,799 A  *  8/1997  Wu et al. ..................... 710/57

* cited by examiner

Primary Examiner—Christopher B. Shin
(74) Attorney, Agent, or Firm—Haynes and Boone, LLP

(57) ABSTRACT

An information handling system includes a processor, a memory coupled to the processor, and a device coupled to the processor. The device includes a module for causing the device to detect a first number of input/output (I/O) transactions received by the device and select a first mode of operation of the device in response to the first number of I/O transactions. The device may include a hard disk drive. The module causes the device to detect the first number of I/O transactions received by the device within a first time range, detect a second number of I/O transactions received by the device within a second time range, and select a second mode of operation of the device in response to the second number of I/O transactions.

20 Claims, 3 Drawing Sheets

SYSTEM, METHOD AND COMPUTER PROGRAM PRODUCT FOR SELECTING A MODE OF OPERATION OF A DEVICE IN AN INFORMATION HANDLING SYSTEM

BACKGROUND

The disclosures herein relate generally to computer systems and more particularly to a system, method, and computer program product for selecting a mode of operation of a device in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Hard disk drives are used for storing information. These drives write information to and read information from a storage media within the drive. Unfortunately, drives typically generate undesirable acoustic outputs, i.e. noise, in the process of writing information to and reading information from the storage media. Although different modes of operation may be selected to reduce the noise, any reduction in noise usually entails a reduction in performance of the drive as well. As a result, a user may be afforded the opportunity to select either a performance mode with a higher performance and a higher noise outputs or a quiet mode with a lower noise output and a lower performance output.

It would be desirable for an information handling system to be able to select a mode of operation of a device that more appropriately suits the needs of the device at a given time. Accordingly, what is needed is a system, method, and computer program product for selecting a mode of operation of a device in an information handling system.

SUMMARY

One embodiment, accordingly, provides an information handling system that includes a processor, a memory coupled to the processor, and a device coupled to the processor. The device includes a module for causing the device to detect a first number of input/output (I/O) transactions received by the device and select a first mode of operation of the device in response to the first number of I/O transactions.

A principal advantage of this embodiment is that various shortcomings of previous techniques are overcome. For example, a mode of operation of a device may by selected dynamically to allow the device to adjust to differing load conditions.

DETAILED DESCRIPTION

Figure 1:
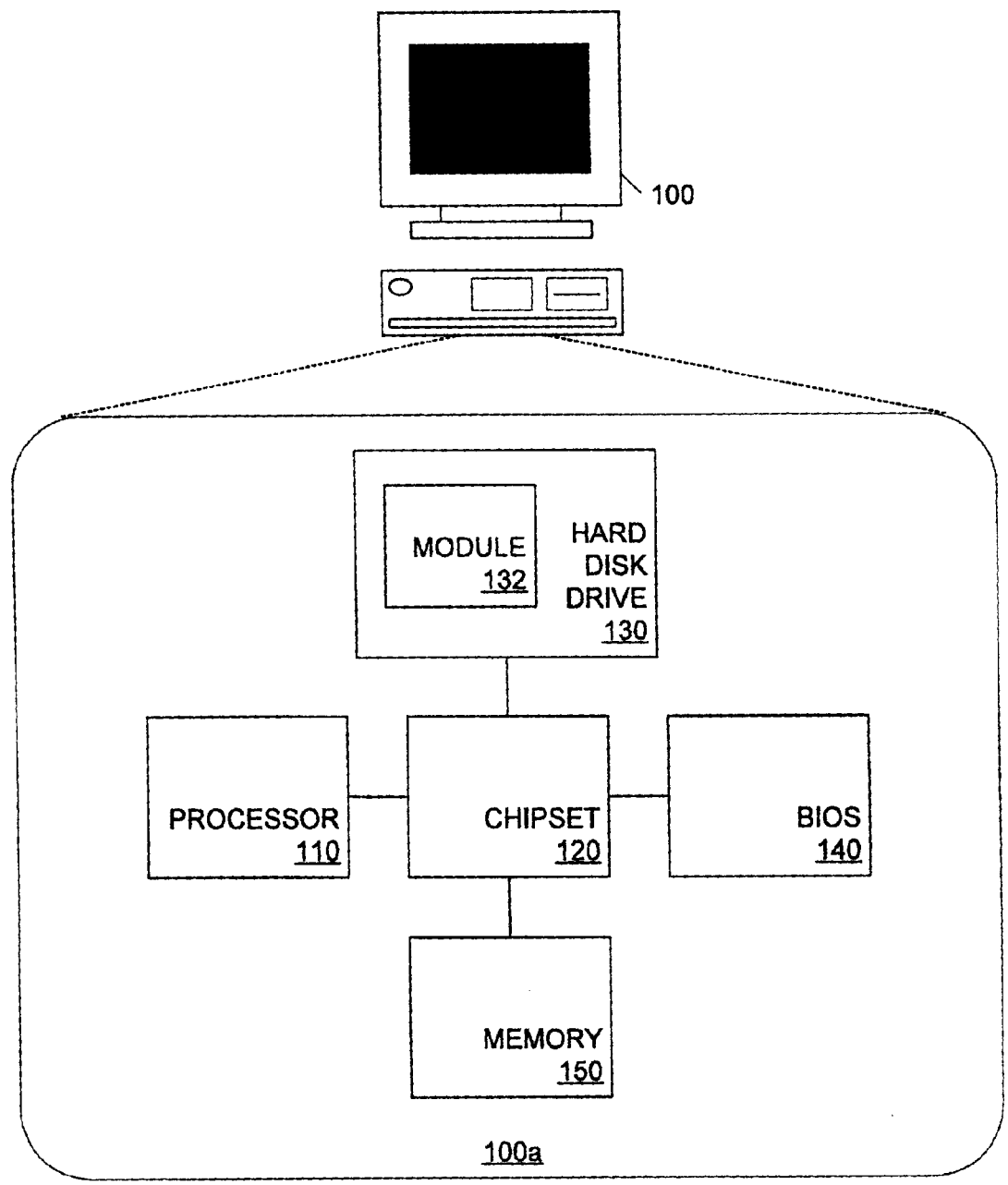
FIG. 1 is a diagram illustrating an embodiment of an information handling system that includes a device with selectable modes of operation.

FIG. 1 is a diagram illustrating an embodiment of selected portions of an information handling system 100. Information handling system 100 is an instrumentality or aggregate of instrumentalities primarily designed to compute, classify, process, transmit, receive, retrieve, originate, switch, store, display, manifest, detect, record, reproduce, handle, or utilize any form of information, intelligence or data for business, scientific, control or other purposes. As shown in a box 100*a*, system 100 includes a processor 110, a chipset 120, a hard disk drive 130, a basic input output system (BIOS) 140, and a memory 150. Chipset 120 is coupled to processor 110, drive 130, BIOS 140, and memory 150.

System 100 operates by executing BIOS 140 or a system firmware (not shown) in response to being powered up or reset. BIOS 140 identifies and initializes the components of system 100 and causes an operating system (not shown) to be booted. The operating system provides a user of system 100 with an ability to initiate and run one or more applications (not shown) on system 100. The applications may be stored on a storage device of system 100 or on a remote device configured to communicate with system 100. System 100 may be configured to communicate with other devices or information handling systems.

In system 100, drive 130 includes a module 132 In one embodiment, module 132 includes a set of instructions processable by drive 130 for causing a mode of operation of drive 130 to be selected in response to a number of input/output (I/O) transactions received by drive 130. These instructions may include software used to operate and/or control drive 130. In an alternative embodiment, module 132 includes digital circuitry for causing a mode of operation of drive 130 to be selected in response to a number of input/output (I/O) transactions received by drive 130. Other embodiments of module 132 may include a combination of hardware and software components to perform the functions of module 132 described herein. Module 132 is stored in an apparatus in drive 130. The apparatus may be any type of memory device such as a RAM or a ROM and may include additional logic circuitry or other software as appropriate for the implementation of module 132.

Drive 130 receives I/O transactions from chipset 120 or other components of system 100. I/O transactions typically include an instruction that indicates information to be read from (i.e., a read) or written to (i.e., a write) drive 130. These instructions are generated by processor 110 or another device in system 100 in response to instructions in BIOS 140, the operating system of system 100, or other applications, programs, scripts, or drivers executed within system 100. In response to receiving I/O transactions, drive 130 processes the information associated with each I/O transaction, performs the function (i.e., read or write) specified by the I/O transaction, and provides any results to chipset 120 or another device in system 100.

Drive 130 includes magnetic platters for storing information. To read or write information to the platters, an actuator typically moves heads attached to an actuator arm over the platters to align a head with an appropriate location on a platter. The platters are also typically rotated about a spindle to allow the head and the platter location to properly align. The movement of the actuator arm and the rotation of the spindle often generate undesirable acoustic noise.

Drive 130 includes a number of operating modes. These operating modes include various characteristics such as acoustic (noise) output and performance or speed output. The acoustic output refers to the amount or level of audible noise generated by drive 130, and the performance output refers to the amount of information written to or read from drive 130 over a period of time. The number of operating modes of drive 130 may vary between different types of hard disk drives. The operating modes may be defined according to an industry or product standard or interface standard such as the IDE/AT, SCSI, or Fibre Channel interface standards. Accordingly, drive 130 may be a IDE/AT, SCSI, or Fibre Channel hard disk drive.

During operation of drive 130, it is desirable to maximize the performance output of drive 130 while minimizing the acoustic output of drive 130. However, the acoustic output of drive 130 may vary proportionately with the performance output of drive 130. Because the various modes of operation of drive 130 may vary in performance output and acoustic output characteristics, different modes of operation may be desirable in different circumstances.

Module 132 detects a number of I/O transactions received by drive 130 and causes a mode of operation of drive 130 to be selected according to the number of I/O transactions received by drive 130. Module 132 selects a mode of operation according to the performance output and acoustic output of the mode. For example, module 132 may cause a mode of operation with a relatively higher performance output to be selected in response to detecting a relatively high number of I/O transactions and may cause a mode of operation with a relatively lower acoustic output to be selected in response to detecting a relatively low number of I/O transactions.

Module 132 may cause the number of I/O transactions to be detected in various ways. For example, module 132 may cause a transaction queue within drive 132 to be examined. Drive 130 may cause each incoming transaction to be tagged and placed in the transaction queue. Module 132 may use the queue to detect to the number of I/O transactions waiting to be processed and may use this number to select a mode of operation. As another example, module 132 may cause the duty cycle of accesses to the storage media of drive 130 to be detected and used to extrapolate the number of I/O transactions received by drive 130. Module 132 may detect a relatively high number of I/O transactions in response to detecting a relatively high duty cycle, e.g. above 50%, and may detect a relatively low number of I/O transactions in response to detecting a relatively low duty cycle, e.g. below 50%.

Figure 2:
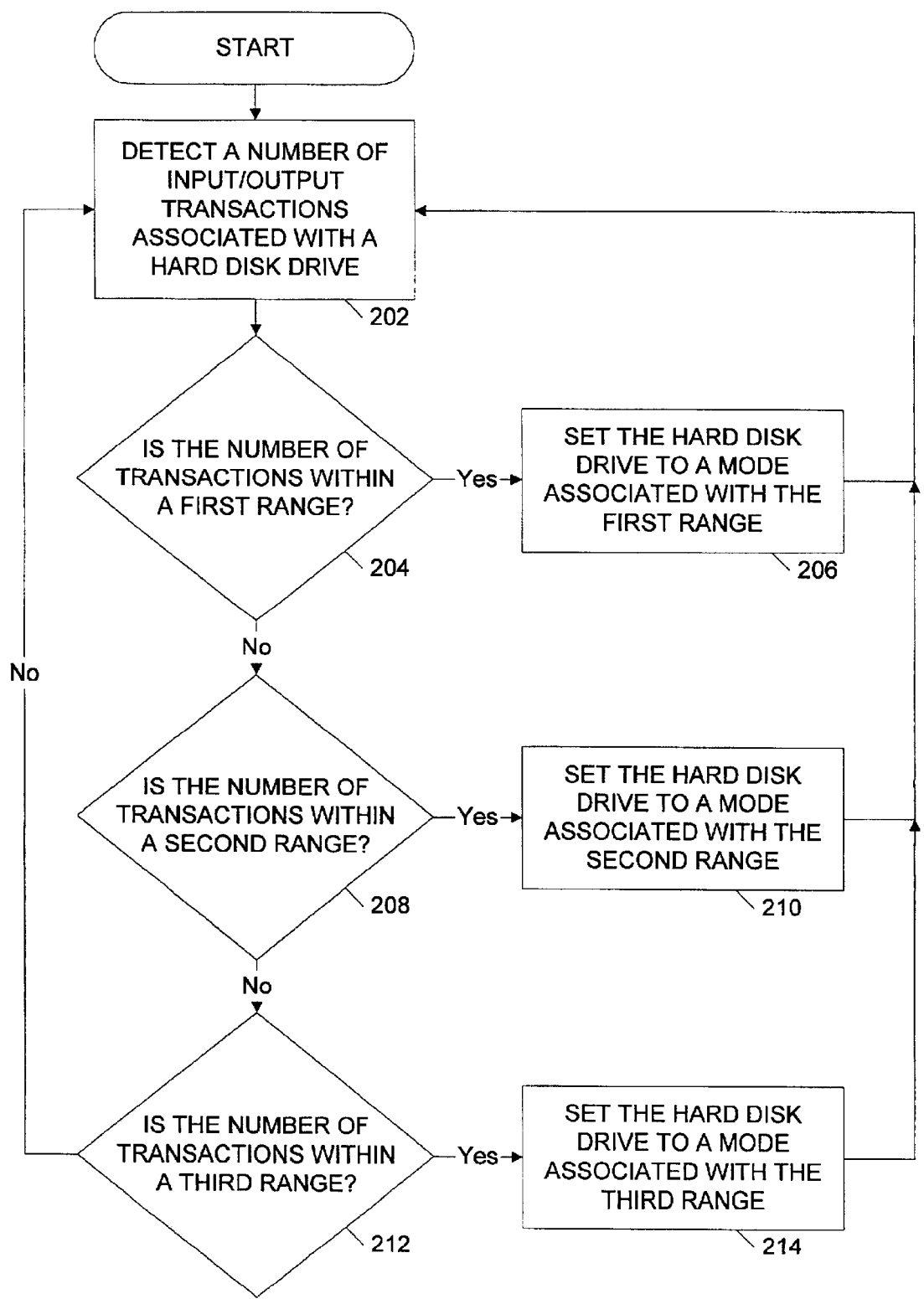
FIG. 2 is a flow chart illustrating an embodiment of a method for selecting a mode of operation of a device in an information handling system.
Figure 3:
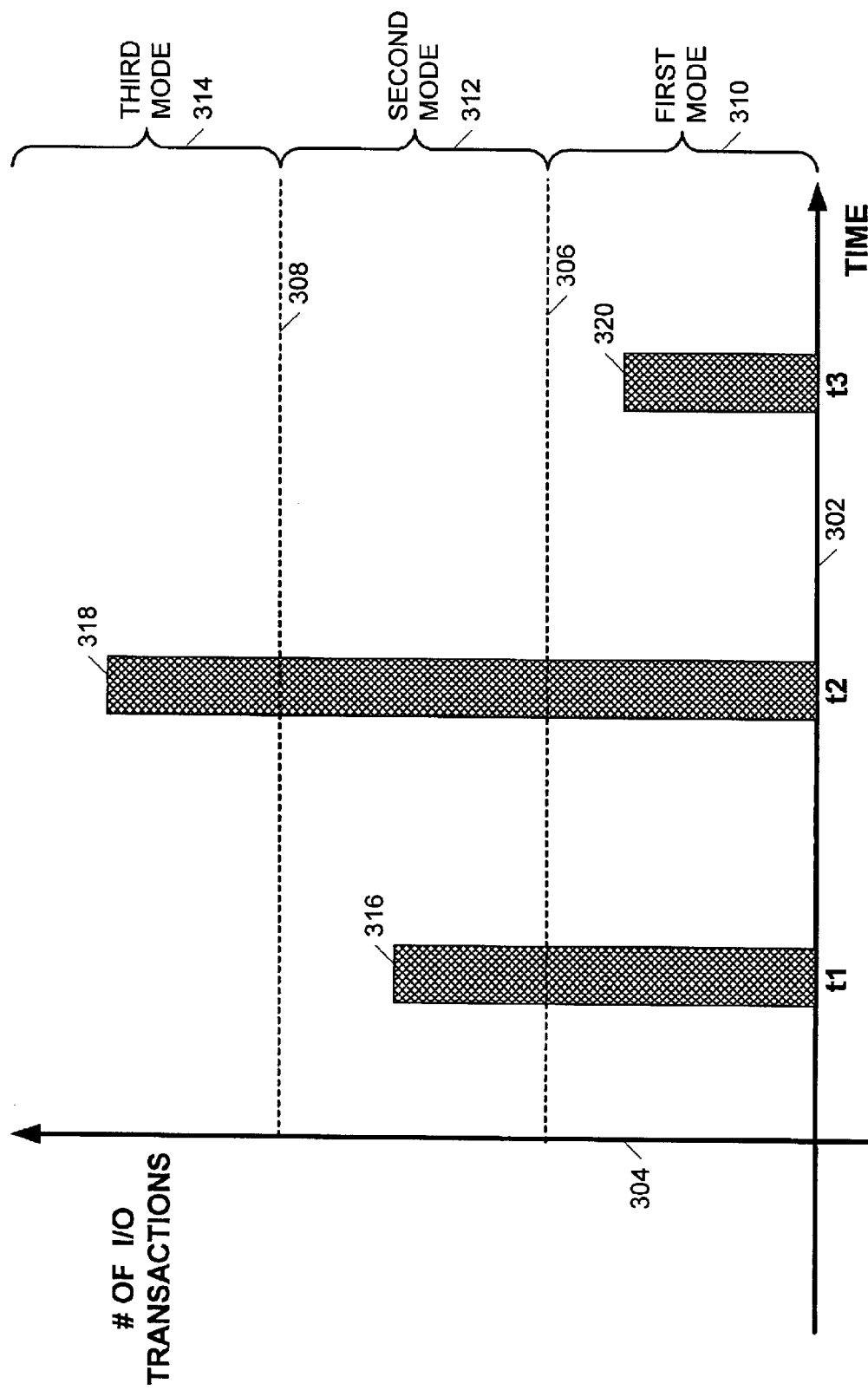
FIG. 3 is a graph illustrating an example of information used to select a mode of operation of a device in FIG. 1.

FIG. 2 is a flow chart illustrating an embodiment of a method for selecting a mode of operation of a device in an information handling system. In the embodiment of FIG. 1, the method is implemented in module 132. In other embodiments, the method may be implemented in one or more other components of drive 130 or system 100. The method of FIG. 2 will be described with reference to the embodiment of FIG. 1 and a graph 300, shown in FIG. 3, that illustrates an example of information used to select a mode of operation of a device in FIG. 1. The graph 300 includes an x-axis 302 that represents time and a y-axis that represents a number of I/O transactions.

Referring to FIG. 2, a number of I/O transactions associated with drive 130 are detected as indicated in a step 202. This detection may occur at periodic time intervals or may occur in response to other events associated with drive 130. In graph 300, the number of I/O transactions are detected at times t1, t2, and t3 as indicated by bars 316, 318, and 320, respectively.

A determination is made as to whether the number of I/O transactions is within a first range as indicated in a step 204. A first range is shown conceptually in graph 300 as being between zero and the number of I/O transactions associated with a dotted line 306. At times t1 and t2, the number of I/O transactions is not within the first range as indicated by bars 316 and 318. Accordingly, the method would continue at step 208 at these times. At time t3, however, the number of I/O transactions is within the first range as indicated by bar 320. Accordingly, drive 130 would be set to a first mode of operation associated with the first range as indicated in a step 206. The association of the first mode of operation with the first range is indicated by a bracket 310 in FIG. 3. Subsequent to step 206, the method would repeat step 202.

Where the number of transactions was not within the first range, a determination is made as to whether the number of I/O transactions is within a second range as indicated in a step 208. A second range is shown conceptually in graph 300 as being between the number of I/O transactions associated with the dotted line 306 and the number of I/O transactions associated with a dotted line 308. At times t2 and t3, the number of I/O transactions is not within the second range as indicated by bars 318 and 320. Accordingly, the method would continue at step 212 at these times. At time t1, however, the number of I/O transactions is within the second range as indicated by bar 316. Accordingly, drive 130 would be set to a second mode of operation associated with the second range as indicated in a step 210. The association of the second mode of operation with the second range is indicated by a bracket 312 in FIG. 3. Subsequent to step 210, the method would repeat step 202.

Where the number of transactions was not within the first range or the second range, a determination is made as to whether the number of I/O transactions is within a third range as indicated in a step 212. A third range is shown conceptually in graph 300 as being above the number of I/O transactions associated with the dotted line 308. At times t1 and t3, the number of I/O transactions is not within the third range as indicated by bars 316 and 320. Accordingly, the method would continue at step 202 at these times. At time t2, however, the number of I/O transactions is within the third range as indicated by bar 318. Accordingly, drive 130 would be set to a third mode of operation associated with the third range as indicated in a step 214. The association of the third mode of operation with the third range is indicated by a bracket 314 in FIG. 3. Subsequent to step 214, the method would repeat step 202.

The first, second, and third modes of operation just described may each have different acoustic and performance characteristics. For example, the performance of drive 130 may be low in the first mode of operation, moderate in the second mode of operation, and high in the third mode of operation. The acoustic output of drive 130 may be low in the first mode of operation, moderate in the second mode of operation, and high in the third mode of operation. Accordingly, module 132 may cause the first mode of operation to be selected in response to detecting a low number of I/O transactions, as in the case of time t3 in graph 300. Likewise, module 132 may cause the second mode of operation to be selected in response to detecting a moderate number of I/O transactions, as in the case of time t1 in graph 300, and module 132 may cause the third mode of operation to be selected in response to detecting a high number of I/O transactions as in the case of time t2 in graph 300.

In an alternate embodiment of the method shown in FIG. 2, module 132 may set drive 130 to a default mode of operation in response to the number of I/O transactions not being within one or more specified ranges. For example, module 132 may default to setting drive 130 to the third mode of operation in the example described above in response to the number of I/O transactions not being within the first or second ranges. In this example, step 212 is omitted, and step 214 is performed automatically in response to the number of I/O transactions not being within the first or second ranges as determined in steps 204 and 208.

As noted above, FIG. 3 is shown by way of example. In other embodiments, module 132 may set drive 130 to any number of modes of operation in response to any number of ranges of I/O transactions. In addition, module 132 may set drive 130 to only selected modes of operation of drive 130 regardless of the number of modes of operation included within drive 130.

For purposes of these embodiments, an information handling system may include any instrumentality or aggregate of instrumentalities primarily designed to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

As can be seen, the principal advantages of these embodiments are that various shortcomings of previous techniques are overcome. For example, a mode of operation of a device may by selected dynamically to allow the device to adjust to differing load conditions.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An information handling system comprising:
    a processor;
    a memory coupled to the processor; and
    a device coupled to the processor for switching modes automatically based on a received number of transactions and including a module for causing the device to:
    detect a first number of input/output (I/O) transactions received by the device; and
    select a first mode of operation of the device in response to the first number of I/O transactions, the first mode relating to a first acoustic output proportional to a first performance output.

2. The information handling system of claim 1, wherein the device is a hard disk drive.

3. The information handling system of claim 1, wherein the module is for causing the device to:
    detect the first number of I/O transactions received by the device within a first time range;
    detect a second number of I/O transactions received by the device within a second time range; and
    select a second mode of operation of the device in response to the second number of I/O transactions, the second mode relating to a second acoustic output proportional to a second performance output, each different from the first such outputs.

4. The information handling system of claim 3, wherein the first mode of operation causes a lower acoustic output of the device than the second mode of operation.

5. The information handling system of claim 3, wherein the first mode of operation causes a higher performance output of the device than the second mode of operation.

6. The information handling system of claim 1, wherein the module is for causing the device to:
    detect the first number of I/O transactions received by the device using a queue of the device.

7. The information handling system of claim 1, wherein the module is for causing the device to:
    detect the first number of I/O transactions received by the device using a duty cycle of the device.

8. The information handling system of claim 1, wherein the module comprises a plurality of instructions processable by the device.

9. A method performed by a device comprising:
    detecting a first number of input/output (I/O) transactions received by the device within a first time range;
    selecting a first mode of operation of the device in response to the first number of I/O transactions, the first mode relating to a first acoustic output proportional to a first performance output; and
    switching modes automatically based on a received number of transactions.

10. The method of claim 9, further comprising:
    detecting a second number of I/O transactions received by the device within a second time range; and
    selecting a second mode of operation of the device in response to the second number of I/O transactions, the second mode relating to a second acoustic output proportional to a second performance output, each different from the first such outputs.

11. The method of claim 10, wherein the first mode of operation causes a lower acoustic output of the device than the second mode of operation.

12. The method of claim 10, wherein the first mode of operation causes a higher performance output of the device than the second mode of operation.

13. The method of claim 9, further comprising:
    detecting the first number of I/O transactions received by the device using a queue of the device.

14. The method of claim 9, further comprising:
    detecting the first number of I/O transactions received by the device using a duty cycle of the device.

15. A computer program product comprising:
    a computer program processable by a device for causing the device to:

detect a first number of input/output (I/O) transactions received by the device within a first time range;

select a first mode of operation of the device in response to the first number of I/O transactions, the first mode relating to a first acoustic output proportional to a first performance output; and automatically switch modes based on a received number of transactions; and an apparatus from which the computer program is accessible by the device.

16. The computer program product of claim 15, wherein the computer program is for causing the device to:

detect a second number of I/O transactions received by the device within a second time range; and select a second mode of operation of the device in response to the second number of I/O transactions, the second mode relating to a second acoustic output proportional to a second performance output, each different from the first such outputs.

17. The computer program product of claim 16, wherein the first mode of operation causes a lower acoustic output of the device than the second mode of operation.

18. The computer program product of claim 16, wherein the first mode of operation causes a higher performance output of the device than the second mode of operation.

19. The computer program product of claim 15, wherein the computer program is for causing the device to:

detect the first number of I/O transactions received by the device using a queue of the device.

20. The computer program product of claim 15, wherein the computer program is for causing the device to:

detect the first number of I/O transactions received by the device using a duty cycle of the device.

* * * * *